(12) United States Patent
Kim

(10) Patent No.: US 7,342,637 B2
(45) Date of Patent: Mar. 11, 2008

(54) LIQUID CRYSTAL DISPLAY DEVICE AND METHOD FOR MANUFACTURING THE SAME

(75) Inventor: Cheol Se Kim, Daegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/400,508

(22) Filed: Mar. 28, 2003

(65) Prior Publication Data

US 2003/0184688 A1    Oct. 2, 2003

(30) Foreign Application Priority Data

Mar. 29, 2002   (KR) .................... 10-2002-0017361

(51) Int. Cl.
  *G02F 1/13*    (2006.01)
  *G02F 1/1343*  (2006.01)
(52) U.S. Cl. .................. 349/187; 349/42; 349/139; 438/754
(58) Field of Classification Search ............ 349/42–43, 349/139, 187; 438/486–487, 747–748, 754
See application file for complete search history.

(56) References Cited

U.S. PATENT DOCUMENTS

| | | | | |
|---|---|---|---|---|
| 5,667,631 A | * | 9/1997 | Holland et al. ............ | 216/13 |
| 6,448,158 B2 | * | 9/2002 | Peng et al. ................ | 438/487 |
| 2001/0030717 A1 | * | 10/2001 | Kaneko et al. ............ | 349/43 |
| 2003/0134122 A1 | * | 7/2003 | Wickboldt et al. ........ | 428/411.1 |
| 2003/0178650 A1 | * | 9/2003 | Sonoda et al. ............ | 257/204 |
| 2005/0209119 A1 | * | 9/2005 | Ishikawa et al. .......... | 510/175 |

FOREIGN PATENT DOCUMENTS

| | | | |
|---|---|---|---|
| JP | 08-060349 | * | 5/1996 |
| JP | 09061835 A | | 3/1997 |
| JP | 1001 2060 | | 1/1998 |
| JP | 11-264995 | * | 9/1999 |
| KR | 10-2002-0015237 A | | 2/2002 |

OTHER PUBLICATIONS

Hosono, Hideo, et al. "Excimer Laser Crystallization of Amorphous Indium-Tin-Oxide and Its Application to Fine Patterning." Jpn. J. Appl. Phys. vol. 37 (1998) pp. L1119-L1121. Part 2, No. 10A, Oct. 1, 1998.

* cited by examiner

*Primary Examiner*—Dung T. Nguyen
(74) *Attorney, Agent, or Firm*—McKenna Long & Aldridge LLP

(57) ABSTRACT

A method for manufacturing the LCD device includes forming a thin film transistor array having gate and data lines crossing to each other, defining pixel regions on a substrate, and thin film transistors arranged at crossings of the gate and data lines; forming a passivation layer over the entire surface of the substrate; forming a contact hole in the passivation layer exposing drain electrodes of each thin film transistor; forming an amorphous indium tin oxide film on the passivation layer; selectively crystallizing portions of the amorphous indium tin oxide film within the pixel regions by selectively irradiating light onto the amorphous indium tin oxide thin film; and forming a pixel electrode by selectively removing uncrystallized portions of the amorphous indium tin oxide thin film.

13 Claims, 7 Drawing Sheets

LIQUID CRYSTAL DISPLAY DEVICE AND METHOD FOR MANUFACTURING THE SAME

This application claims the benefit of the Korean Application No. P2002-17361 filed on Mar. 29, 2002, which is hereby incorporated by reference for all purposes as if fully set forth herein.

BACKGROUND OF THE INVENTION

1. Field of the Invention

The present invention relates to a liquid crystal display (LCD) device and a method for manufacturing the same. More particularly, the present invention relates to a method for manufacturing a pixel electrode of a liquid crystal display (LCD) device by irradiating portions of an amorphous indium tin oxide (ITO) deposited on a passivation layer with light (e.g., an excimer laser beam, UV light, etc.) to selectively form crystalline (or polycrystalline) indium tin oxide and selectively etching the uncrystallized portions of amorphous indium tin oxide.

2. Discussion of the Related Art

Owing to their small size, reduced thickness and weight, ability to display grayscales and moving pictures while consuming a minimal amount of power, liquid crystal display (LCD) devices are used as substitutes for cathode ray tubes (CRTs). LCD devices generally comprise an LCD panel made up of a thin film transistor (TFT) substrate and a color filter substrate separated from each other by a layer of liquid crystal material.

The thin film transistor (TFT) substrate supports a plurality of gate lines and data lines, crossing the gate lines. Thin film transistors (TFTs) are formed at crossings of the gate and data lines and pixel electrodes are formed in pixel regions defined by the plurality of gate and data lines. The color filter substrate supports a color filter layer and a common electrode. The layer of liquid crystal material may be interposed between the two substrates through an injection process. Electrodes are formed on surfaces of the TFT and the color filter substrates such that the surfaces of the two substrates supporting the electrodes face each other and contact molecules of the layer of liquid crystal material injected between the two substrates.

Images are displayed on the LCD panel by selectively controlling the light transmittance characteristics of the layer of liquid crystal material. Accordingly, electric fields, generated upon the application of a voltage to the electrodes on the two substrates, affect the orientation of molecules of the layer of liquid crystal material to control the light transmittance characteristics of the layer of liquid crystal material.

LCD devices known as active matrix LCD (AM-LCD) devices have are capable of displaying images at high resolutions as well as high quality moving images. AM-LCD devices include TFTs connected to pixel electrodes arranged in a matrix pattern on a lower substrate, a common electrode on an upper substrate, and a layer of liquid crystal material interposed between the upper and lower substrates. In AM-LCD devices, molecules of the layer of liquid crystal material are driven by electric fields present between the pixel and common electrodes and substantially perpendicular to the lower and upper substrates.

A related art LCD device will now be explained in greater detail.

FIG. 1A illustrates a schematic view of a related art LCD device and FIG. 1B illustrates a cross-sectional view of the related art LCD device of FIG. 1A taken along line I-I'.

Referring to FIG. 1A, the related art LCD device includes a plurality of gate lines 1 and data lines 3 formed to cross each other and to define a plurality of pixel regions, a plurality of pixel electrodes 8 formed in respective ones of the pixel regions, and a plurality of thin film transistors 7 formed at crossings of the gate and data lines 1 and 3 capable of applying video signals from the data lines 3 to corresponding pixel electrodes 8 in response to signals from the gate lines 1. The gate and data lines 1 and 3 are made of a semitransparent material such as an aluminum metal compound having a low resistance while the pixel electrodes 8 are made of a transparent material such as indium tin oxide (ITO).

Referring to FIG. 1B, the gate line 1 is formed along a first direction on a first substrate 9 and includes a gate electrode 2 protruding from the gate line 1. Next, a gate insulating layer 11 is formed over the entire surface of the first substrate 1 and on the gate line 1. Next, an island-shaped semiconductor layer 12 is formed on the gate insulating layer 11 in a region above the gate electrode 2. The data line 3 is formed on the gate insulating layer 11 along a second direction, substantially perpendicular to the first direction. A source electrode 5a is formed to protrude from the data line 3 and extend over a first side of the semiconductor layer 12 while a drain electrode 5b is formed to extend over a second side of the semiconductor layer 12, opposite the first side, and spaced apart from the source electrode 5a by a predetermined distance. Accordingly, a thin film transistor (TFT) 7 is formed where each of the gate and data lines 1 and 3 cross each other.

Subsequently, a passivation layer 13 is formed over the entire surface of the first substrate 9 and on the thin film transistor 7. Further, a contact hole is formed in a portion of the passivation layer over the drain electrode 5b. The pixel electrode 8 is then formed on the passivation layer 13 in the pixel region and is electrically connected to the drain electrode 5b through the contact hole. Next, a first alignment layer 17a, capable of regularly orienting liquid crystal molecules, is formed over the entire surface of the first substrate 9 and on the pixel electrode 8 and passivation layer 13.

Still referring to FIG. 1B, a second substrate 10 supports a black matrix layer 14 for preventing light leakage in regions outside the pixel region of the first substrate 9 (i.e., regions corresponding to the gate line 1, the data line 3, and the thin film transistor 7), Red/Green/Blue (R/G/B) color filter layers 15 for selectively transmitting light having predetermined wavelengths formed within each pixel region, a common electrode 16 having a potential different from that of the pixel electrode 8, and a second alignment layer 17b, capable of regularly orienting liquid crystal molecules, formed over the common electrode 16.

Subsequently, spacers (not shown) and sealant material (not shown) are formed between the first and second substrates 9 and 10, to bond the first and second substrates 9 and 10 together and to uniformly separate the bonded substrates by predetermined distance. Finally, liquid crystal material is injected between the bonded substrates 9 and 10 to form a layer of liquid crystal material 23.

Techniques used in manufacturing the aforementioned LCD device are similar to those used in manufacturing silicon semiconductors. For example both techniques involve thin film deposition process steps and process steps involving the photolithographic patterning of the thin film (e.g., photoresist (PR) deposition, ultraviolet (UV) exposure and developing, etching, and PR strip and cleaning process steps). Accordingly, the aforementioned method of manufacturing LCD devices requires repetitive process steps to form thin films.

FIGS. 2A to 2F illustrate cross-sectional views of process steps required to manufacture the related art LCD device.

Referring first to FIG. 2A, to manufacture the related art LCD devices, a metal layer is deposited on a first substrate 9 and patterned so as to form a gate line 1 and gate electrode 2. Next, a gate insulating layer 11 is deposited over the entire surface of the first substrate 9. Next, the semiconductor layer 12 is deposited over the entire surface of the first substrate 9 and is selectively removed, leaving an island-shaped semiconductor layer 12 above the gate electrode 2, wherein the island-shaped semiconductor layer 12 constitutes the active layer of the thin film transistor (TFT).

Subsequently, a metal layer is deposited over the entire surface of the first substrate 9 and patterned so as to form a data line 3 and source/drain electrodes 5a and 5b, respectively. A passivation layer 13 is formed over the entire surface of the first substrate 9 and on the data line 3. Next, a portion of the passivation layer 13 is selectively removed to form a contact hole exposing the drain electrode 5b. An amorphous indium tin oxide film (a-ITO) is then deposited on the passivation layer 13 in a low temperature sputtering process such that the a-ITO film electrically contacts the drain electrode 5b through the contact hole.

Referring to FIG. 2B, a photoresist layer 20 is deposited on the a-ITO film 8a and is subsequently hardened in a baking process.

Referring to FIG. 2C, a mask 21 is positioned above the photoresist layer 20. Regions of the photoresist layer 20 not directly underlying the mask 21 are then exposed to ultraviolet rays 22.

Referring to FIG. 2D, portions of the photoresist layer 20 that were exposed to the UV light are removed in a developing process.

Referring to FIG. 2E, portions of the a-ITO film 8a, exposed upon the removal of portions of the photoresist layer 20, are etched using an etchant wherein the remaining portions of the photoresist layer 20 act as an etch mask. Generally, etchants such as diluted oxalic acid or diluted hydrochloric acid are used to etch a-ITO films.

Referring to FIG. 2F, the remaining photoresist layer 20 is stripped, the substrate is cleaned, and a pixel electrode 8 is thus formed.

The related art method described above forms the pixel electrode 8 by patterning an amorphous indium tin oxide film deposited on a passivation layer via conventional photolithography and etching processes. Accordingly, the related art method described above is disadvantageous because forming pixel electrodes via conventional photolithography processes (e.g., depositing photoresist layer on the amorphous indium tin oxide thin film, exposing the photoresist layer, developing the photoresist layer, etching the amorphous indium tin oxide thin film using the photoresist layer as an etch mask, stripping the photoresist layer, and cleaning the substrate) increases the risk of generating defects and decreases the yield due to the application of complicated and time consuming photolithographic steps. Further, the monetary expense and time required to install and maintain photolithographic equipment and consistent patterning procedures can be prohibitively excessive.

SUMMARY OF THE INVENTION

Accordingly, the present invention is directed to a liquid crystal display (LCD) device and a method for manufacturing the same that substantially obviates one or more problems due to limitations and disadvantages of the related art.

An advantage of the present invention provides an LCD device and a method for manufacturing the same that is capable of simplifying manufacturing process steps and improving LCD device yield wherein a pixel electrode is formed by selectively irradiating portions of an amorphous indium tin oxide (ITO) deposited on a passivation layer with light (e.g., an excimer laser beam, UV light, etc.) to selectively form crystalline (or polycrystalline) indium tin oxide. Uncrystallized amorphous indium tin oxide may then be selectively etched with respect to crystalline (or polycrystalline) indium tin oxide.

Additional advantages and features of the invention will be set forth in the description which follows and in part will become apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a method for manufacturing a liquid crystal display (LCD) device may, for example, include forming a thin film transistor array having gate and data lines crossing each other on a substrate and defining pixel regions; forming thin film transistors at crossings of the gate and data lines; forming a passivation layer over the entire surface of the substrate; forming a contact hole in a portion of the passivation layer in a region over a drain electrode of each thin film transistor; forming an amorphous indium tin oxide film on the passivation layer; selectively crystallizing the amorphous indium tin oxide by selectively irradiating light to portions of the amorphous indium tin oxide film within the pixel region; and forming a pixel electrode by selectively removing uncrystallized portions of the amorphous indium tin oxide film.

In one aspect of the present invention, the amorphous indium tin oxide film may be selectvely crystallized by, for example, positioning a mask shielding regions outside the pixel regions and exposing regions within the pixel regions and irradiating light onto the exposed portions of the amorphous indium tin oxide film but not onto the shielded portions of the amorphous indium tin oxide film.

In another aspect of the present invention, the light may comprise an excimer laser beam or UV light.

In yet another aspect of the present invention, portions of the amorphous indium tin oxide film that are not crystallized may be selectively removed by an etchant such as diluted oxalic acid, diluted hydrochloric acid, or a weak acid comprising diluted oxalic acid and diluted hydrochloric acid.

In still another aspect of the present invention, the concentration of diluted oxalic acid may be about 10% or less.

In yet another aspect of the present invention, the amorphous indium tin oxide film may be etched by the etchant at a temperature of about 60° C. or less.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

A method for manufacturing an LCD device according to the principles of the present invention will now be explained.

Figure 3A:
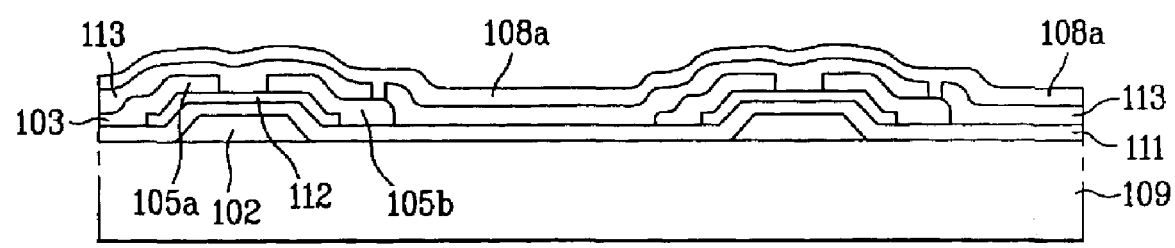
FIGS. 3A to 3C illustrate cross-sectional views of process steps required to manufacture an LCD device according to the principles of the present invention.
Figure 3B:
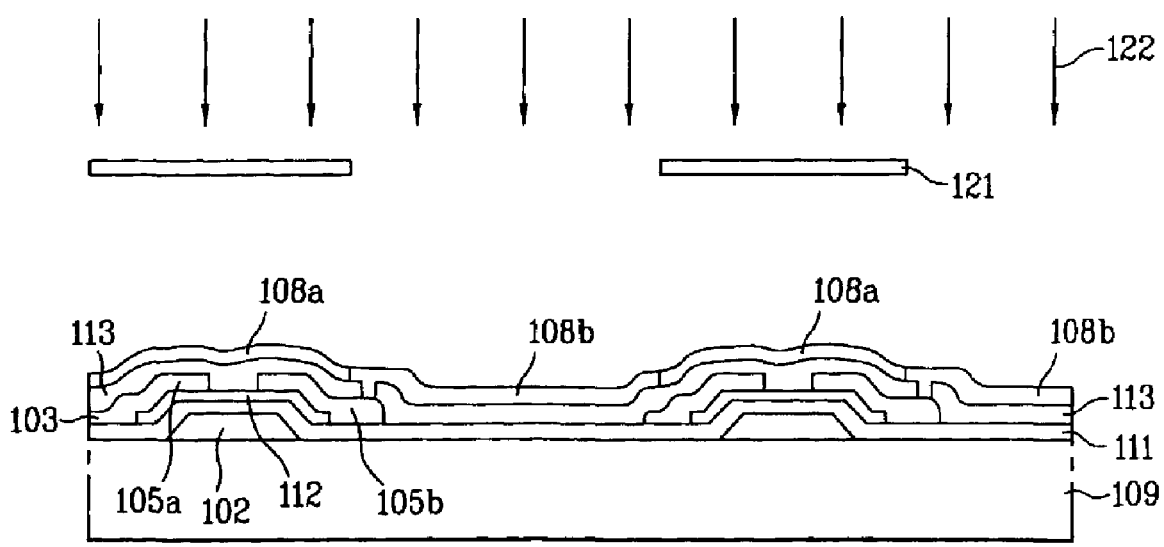
Figure 3C:
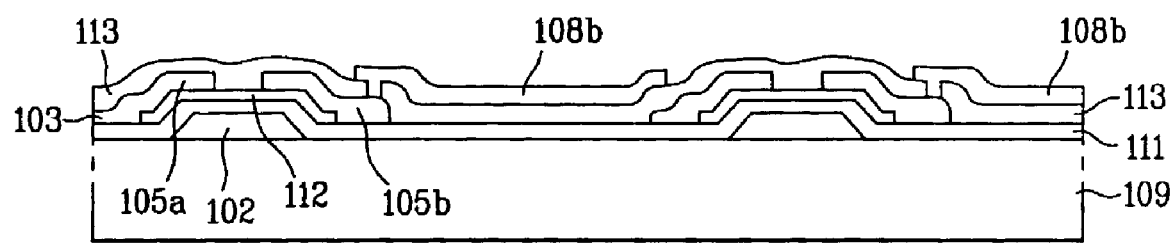

FIGS. 3A to 3C illustrate cross-sectional views of process steps required to manufacture an LCD device according to the principles of the present invention.

Figure 1A:
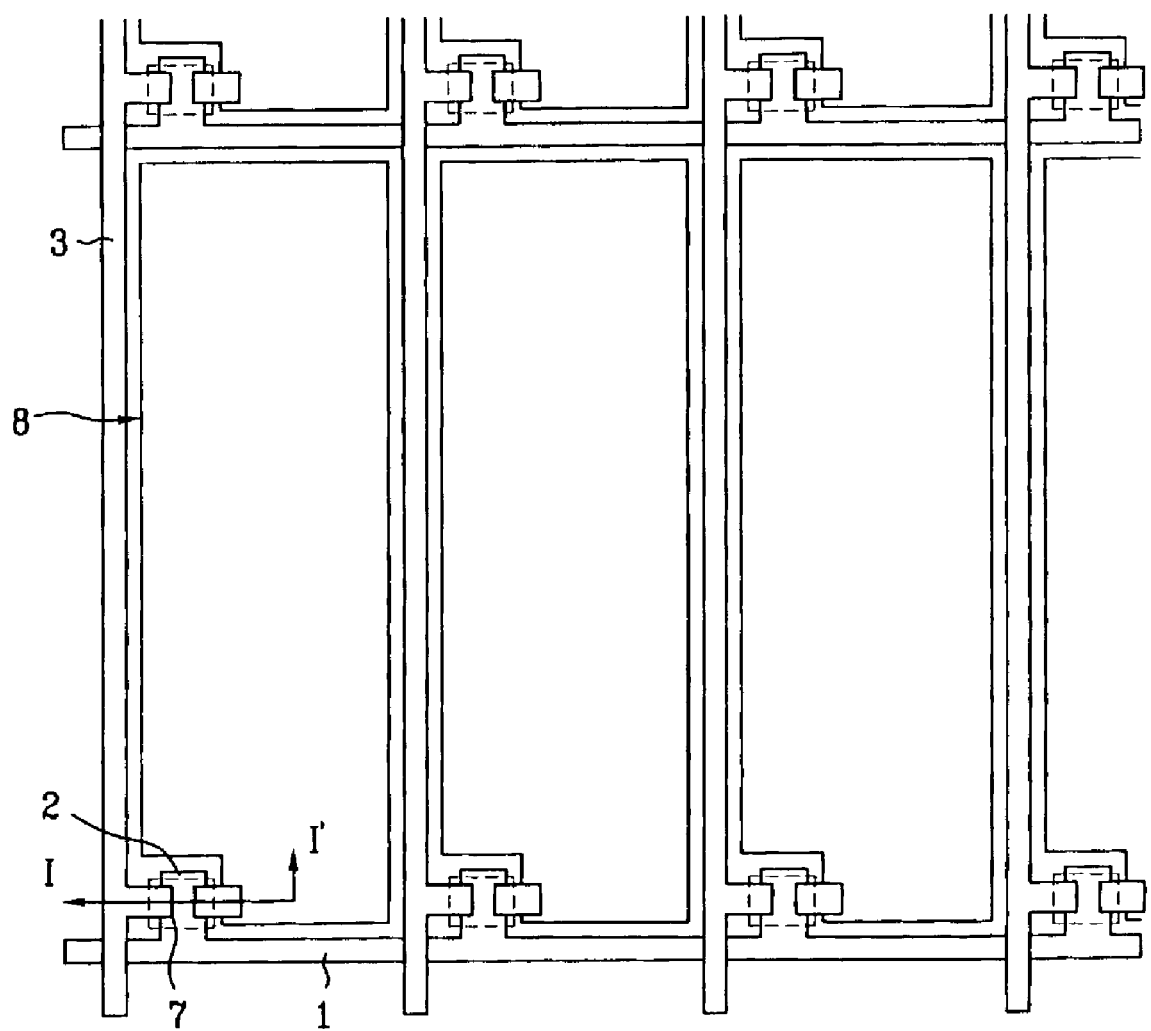
FIG. 1A illustrates a schematic view of a related art LCD device.
Figure 1B:
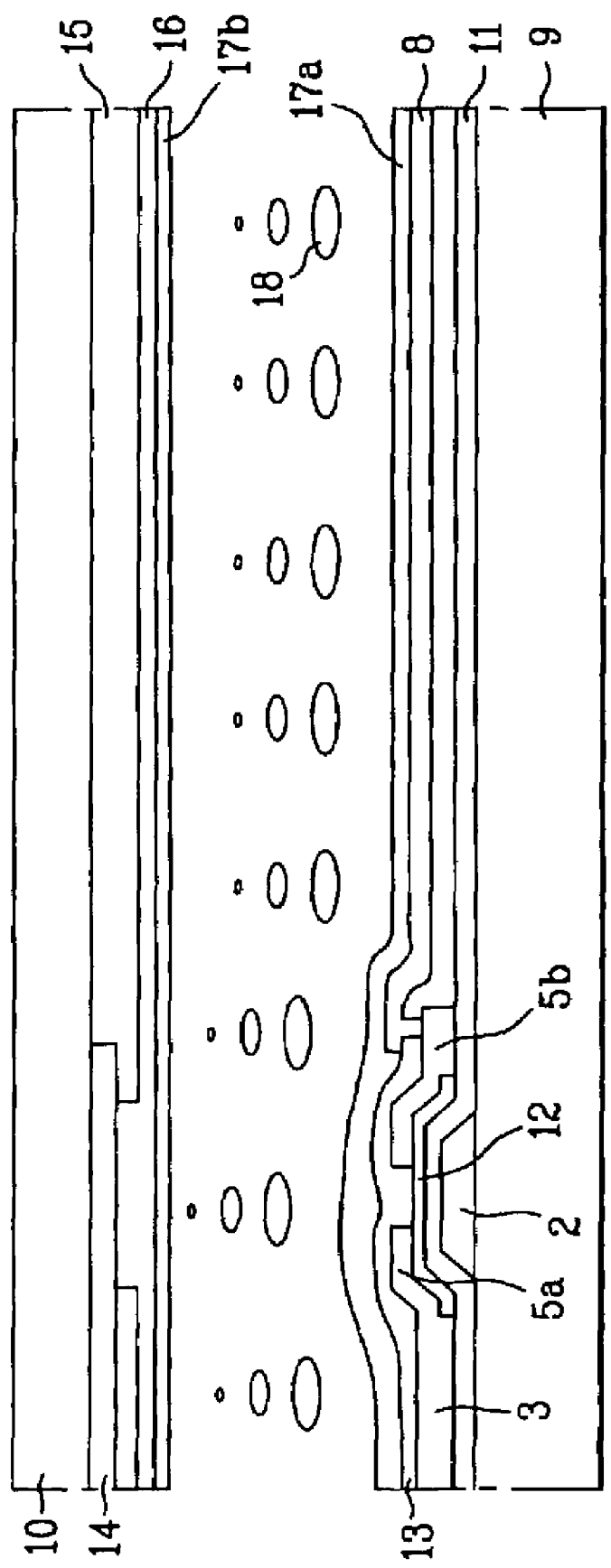
FIG. 1B illustrates a cross-sectional view of the related art LCD device of FIG. 1A taken along line I-I'.
Figure 2A:
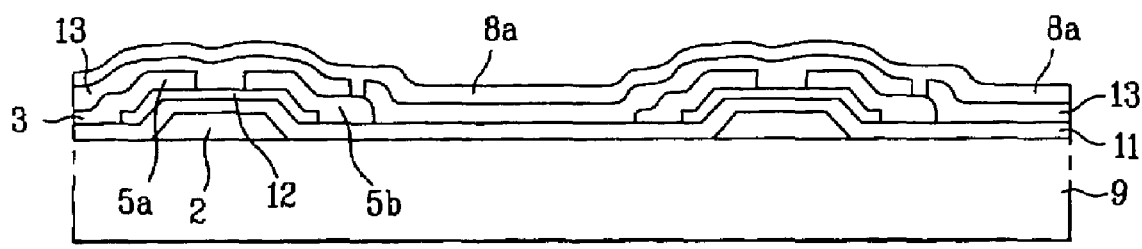
FIGS. 2A to 2F illustrate cross-sectional views of process steps required to manufacture the related art LCD device.
Figure 2B:
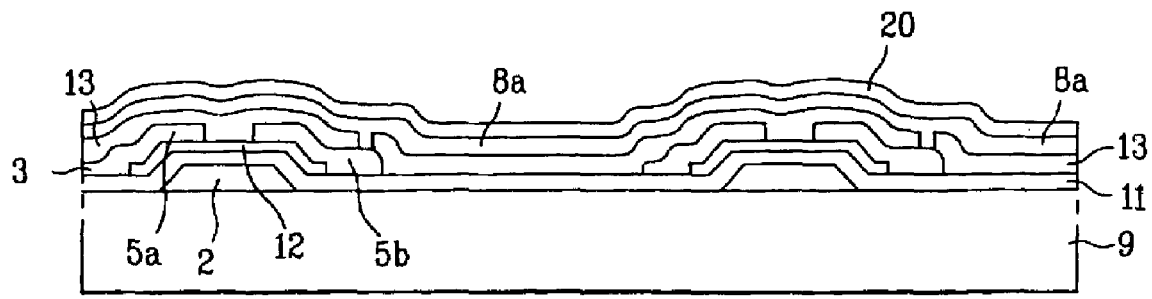
Figure 2C:
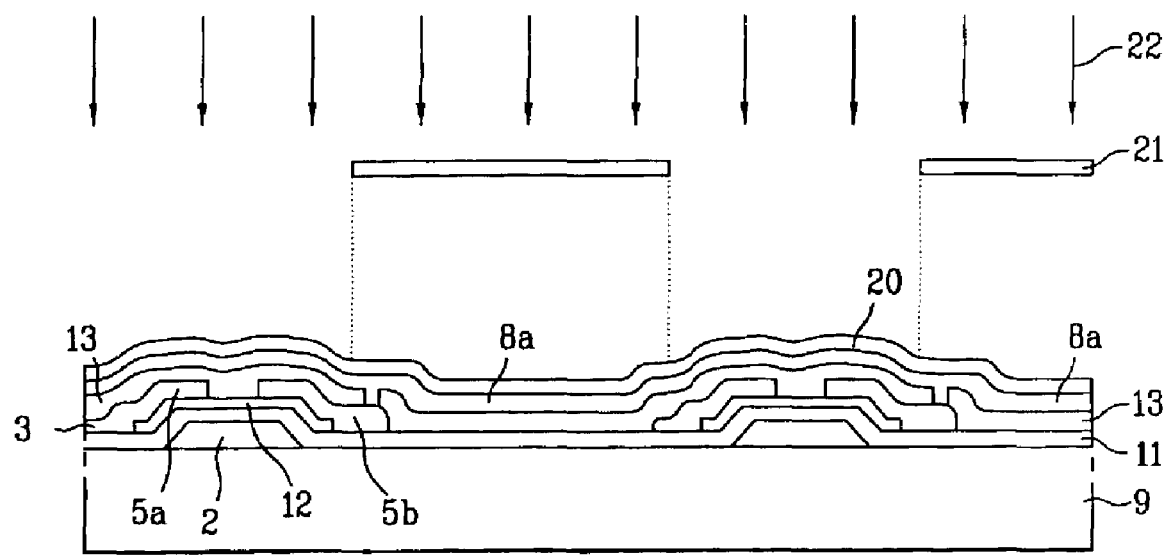
Figure 2D:
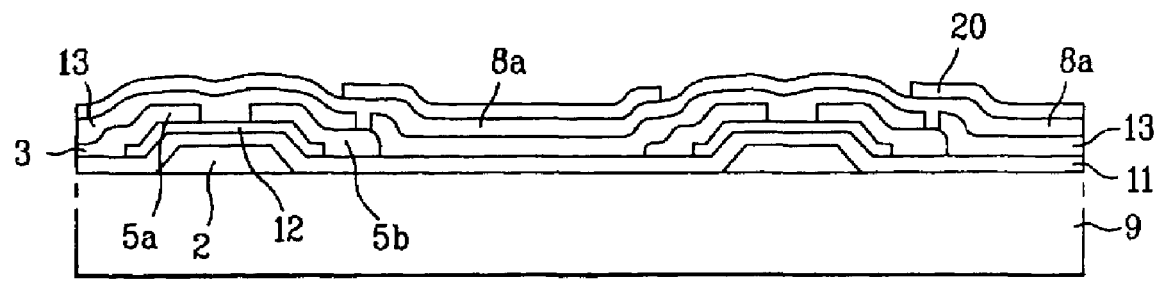
Figure 2E:
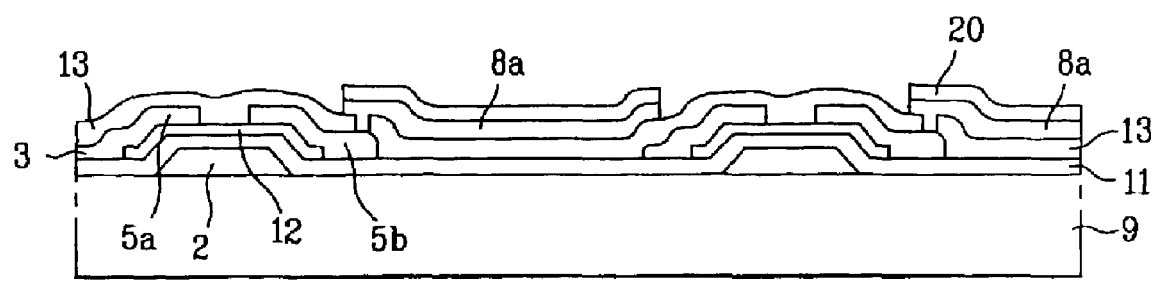
Figure 2F:
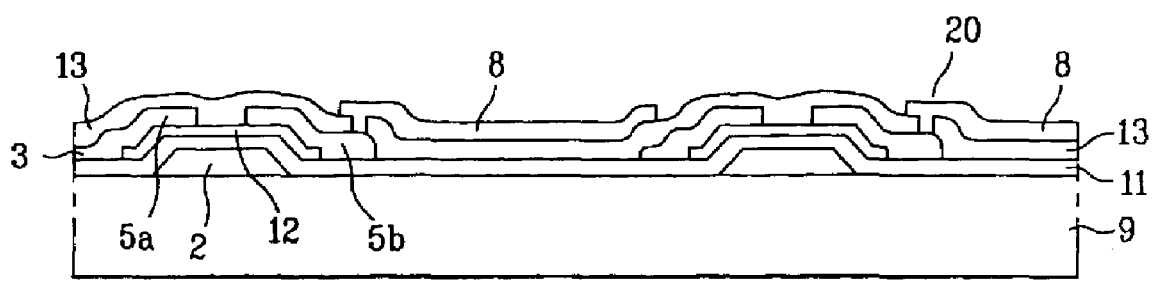

Referring to FIG. 3A, a metal layer may be deposited onto a glass or quartz substrate 109 and patterned into a gate line (not shown), similar to gate line 1 shown in FIG. 1A, and a gate electrode 102. Next, a gate insulating layer 111 and a semiconductor layer may be sequentially deposited over the entire surface of the substrate 109 and on the gate electrode 102. Portions of the semiconductor layer may then be selectively removed to form an island-shaped semiconductor layer 112 above the gate electrode 102, wherein the island-shaped semiconductor layer 112 constitutes the active layer of a thin film transistor (TFT).

Subsequently, a metal layer may be deposited over the entire surface of the substrate 109 and patterned so as to form a data line 103 and source/drain electrodes 105a and 105b, respectively. A passivation layer 113 may be formed over the entire surface of the substrate 109 on the drain electrode 105b. Next, a portion of the passivation layer 113 may be selectively to form a contact hole exposing the drain electrode 105b.

Still referring to FIG. 3A, after the contact hole is formed in the passivation layer 113, an amorphous indium tin oxide (a-ITO) film 108a may be formed on the passivation layer 113. In one aspect of the present invention, the amorphous indium tin oxide film 108a may be formed by a sputtering deposition process. In another aspect of the present invention, the amorphous indium tin oxide film 108a may be formed to electrically contact the drain electrode 105b through the contact hole in the passivation layer 113. In one aspect of the present invention, the amorphous indium tin oxide film 108a may, for example, be formed using a target comprising indium tin oxide. In another aspect of the present invention, a predetermined amount of $H_2O$ or zinc (Zn) may be added to the target. In yet another aspect of the present invention the sputtering process may be performed at a low temperature.

Referring to FIG. 3B, a mask 121 may be positioned above a portion of the substrate 109 where a pixel electrode is not to be formed, exposing portions of the amorphous indium tin oxide 108a in regions where a pixel electrode is to be formed. Subsequently, light (e.g., an excimer laser beam, UV light, etc.) 122 may be selectively irradiated onto portions of the amorphous indium tin oxide film 108a exposed by the mask 121. According to the principles of the present invention, the irradiating light 122 may be characterized as having a predetermined energy and wavelength capable of crystallizing the amorphous indium tin oxide film 108a. Upon being irradiated with the light 122, only the exposed portions of the amorphous indium tin oxide film 108a are crystallized and a crystalline (or polycrystalline) indium tin oxide film 108b may be selectively formed in regions where a pixel electrode is to be formed.

Referring to FIG. 3C, portions of the amorphous indium tin oxide film 108a, masked from the irradiating light 122 by the mask 121, may be etched using an etchant. In one aspect of the present invention, an etchant such as a diluted oxalic acid having a concentration of about 10% or less or a diluted hydrochloric acid may be used to selectively etch the amorphous indium tin oxide film 108a with respect to the crystallized (or polycrystalline) indium tin oxide film 108b. In one aspect of the present invention, the diluted oxalic acid may have a concentration of between about 2% and about 5%. In another aspect of the present invention, the diluted oxalic acid may have a concentration of about 3%.

Referring to Table 1, the etching rates of the amorphous indium tin oxide film 108a and the crystalline (or polycrystalline) indium tin oxide film 108b in diluted oxalic acid having a concentration of about 10% vary according to the etching temperature.

TABLE 1

| Temperature (° C.) | Flux (l/m) | Etching rate (Å/sec) | |
|---|---|---|---|
| | | Amorphous indium tin oxide | Crystalline/polycrystalline indium tin oxide |
| 25 | 30 | 7.9 | 0.0 |
| 30 | 30 | 11.1 | 0.0 |
| 35 | 30 | 14.3 | 0.0 |
| 65 | 30 | — | 1.2 |

Figure 4:
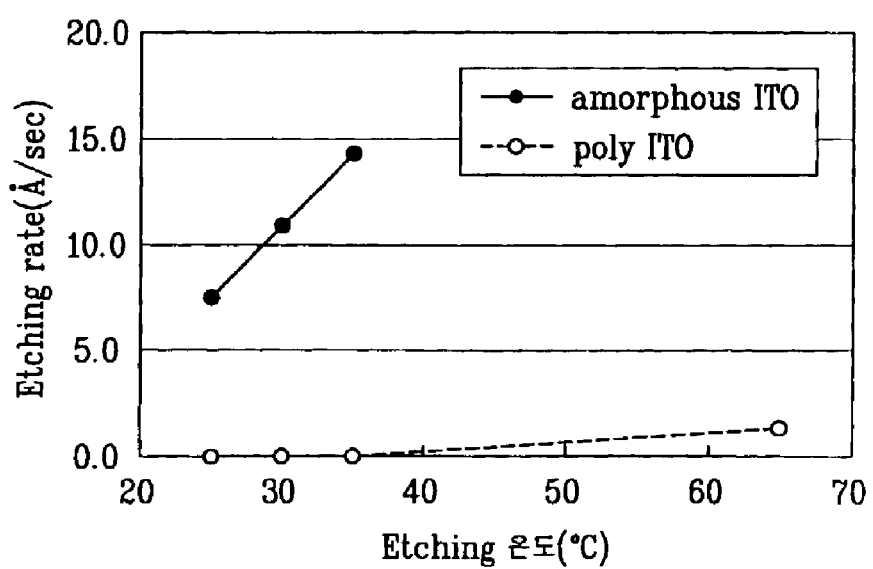
FIG. 4 is a graph illustrating the dependence of the etching rates of amorphous and crystalline indium tin oxide films on etching temperature.

As shown in Table 1, etching rates of various forms of indium tin oxide generally increase as the temperature of the etchant increases. In present invention, a significant amount of amorphous indium tin oxide is etched in diluted oxalic acid across low to high etching temperatures. However, the amount of crystalline (or polycrystalline) indium tin oxide material etched by diluted oxalic acid across the same temperature range is negligible compared to the amount by which amorphous indium tin oxide is similarly etched. Table 1 can be equivalently represented by the graph illustrated in FIG. 4. In view of Table 1 and FIG. 4, an amorphous indium tin oxide film 108a having a thickness of hundreds of angstroms can be completely etched by diluted oxalic acid in hundred seconds at room temperature while a negligible amount of crystalline (or polycrystalline) indium tin oxide is etched by the diluted oxalic acid across the same range of etching temperatures.

According to the principles of the present invention, the irradiating light (e.g., excimer laser beam, UV light, etc.) 122 may be selectively irradiated onto the amorphous indium tin oxide film 108a so as to selectively form a pixel electrode made out of crystalline (or polycrystalline) indium tin oxide film 108b. Further, portions of the amorphous indium tin oxide 108a outside the pixel region and not irradiated by the light 122 may be selectively etched with respect to the portions of the amorphous indium tin oxide 108a within the pixel region and irradiated by the light 122.

According to the principles of the present invention, etching the amorphous indium tin oxide film 108a selectively with respect crystalline (or polycrystalline) indium tin oxide film 108b with an etchant such as diluted oxalic acid, diluted hydrochloric acid, etc., results in reduced manufacturing cost and time compared to related art fabricating techniques such as those illustrated in FIGS. 2A-2F, thereby improving yield.

According to the principles of the present invention, the amorphous indium tin oxide thin film 108a may be deposited on the passivation layer 113. Subsequently, the amorphous indium tin oxide thin film 108a may be selectively irradiated with light 122 (e.g., excimer laser beam, UV light, etc.) to selectively crystallize portions of the amorphous indium tin oxide 108a into a crystalline (or polycrystalline) indium tin oxide film 108b. Portions of the amorphous indium tin oxide film 108a not irradiated with the light 122 may be selectively etched with respect to the portions of the amorphous indium tin oxide film 108b irradiated with the light 122 using an etchant such as diluted oxalic acid, diluted hydrochloric acid, and the like. Accordingly, it is possible to form a pixel electrode made out of crystalline (or polycrystalline) indium tin oxide.

As mentioned above, the method for manufacturing the LCD device according to the principles of the present invention is advantageous because amorphous indium tin oxide material not selectively irradiated by light having a predetermined energy and wavelength may be selectively etched with respect to amorphous indium tin oxide material that has been selectively irradiated by light having a predetermined energy and wavelength using an etchant. Accordingly, a pixel electrode may be formed out of the amorphous indium tin oxide material that has been selectively irradiated by light having a predetermined energy and wavelength. Thus, the method for manufacturing the LCD device according to the principles of the present invention results in reduced manufacturing cost and time compared to related art fabricating techniques such as those illustrated in FIGS. 2A-2F, thereby improving yield.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display (LCD) device, comprising:
    providing a substrate;
    forming a thin film transistor array on the substrate, the thin film transistor array having a plurality of gate lines and data lines, wherein the plurality of gate and data lines cross each other and define a plurality of pixel regions;
    forming a plurality of thin film transistors on a substrate, each of the plurality of thin film transistors comprising a drain electrode;
    forming a passivation layer over the entire surface of the substrate;
    forming a contact hole in the passivation layer over the drain electrodes of the plurality of thin film transistors;
    forming an amorphous indium tin oxide film on the passivation layer, wherein forming the amorphous indium tin oxide film includes using a target wherein zinc is added to the target;
    selectively crystallizing portions of the amorphous indium tin oxide film formed in the pixel regions; and
    selectively etching the uncrystallized portions of the amorphous indium tin oxide film with respect to the crystallized portions of the amorphous indium tin oxide film, the selectively etching including using an etchant having a temperature of about 60° C. or less, wherein the selectively etching includes using an etchant selected from the group consisting of diluted oxalic acid, diluted hydrochloric acid, and combinations of thereof, and the etchant has a concentration between about 2% and about 5%, and flux of the etchant is about 30 liter/minute.

2. The method of claim 1, wherein the selectively crystallizing comprises selectively irradiating portions of the amorphous indium tin oxide film in the pixel regions using light.

3. The method of claim 2, wherein the selectively irradiating comprises positioning a mask directly over portions of the amorphous indium tin oxide film outside the pixel regions, wherein the mask transmits substantially none of the irradiated light.

4. The method of claim 1, wherein the selectively etching includes using an etchant selected from the group consisting of diluted oxalic acid, diluted hydrochloric acid, and combinations thereof.

5. A method for manufacturing a liquid crystal display (LCD) device comprising:
    providing a substrate;
    forming a plurality of gate lines and data lines on the substrate, wherein the plurality of gate and data lines cross each other and define a plurality of pixel regions;
    forming a plurality of thin film transistors at crossings of the plurality of gate and data lines;
    forming an amorphous indium tin oxide film over the substrate, wherein forming the amorphous indium tin oxide film includes using a target wherein zinc is added to the target;
    selectively irradiating portions of the amorphous indium tin oxide film formed in the pixel regions with light, wherein portions of the amorphous indium tin oxide film irradiated with the light are crystallized; and
    selectively etching the uncrystallized portions of the amorphous indium tin oxide film with respect to the crystallized portions of the amorphous indium tin oxide film, the selectively etching including using an etchant having a temperature of about 60° C. or less, selectively etching the uncrystallized portions of the amorphous indium tin oxide film with respect to the crystallized portions of the amorphous indium tin oxide film, the selectively etching including using an etchant having a temperature of about 60° C. or less, wherein the selectively etching includes using an etchant selected from the group consisting of diluted oxalic acid, diluted hydrochloric acid, and combinations of thereof, and the etchant has a concentration between about 2% and about 5%, and flux of the etchant is about 30 liter/minute.

6. The method of claim 5, wherein the selectively irradiating comprises positioning a mask over portions of the amorphous indium tin oxide film outside the pixel regions, wherein the mask transmits substantially none of the irradiated light.

7. A method for manufacturing a liquid crystal display (LCD) device, comprising:

providing a substrate;

forming a thin film transistor array on the substrate, the thin film transistor array having a plurality of gate lines and data lines, wherein the plurality of gate and data lines cross each other and define a plurality of pixel regions;

forming a plurality of thin film transistors on a substrate, each of the plurality of thin film transistors comprising a drain electrode; forming a passivation layer over the entire surface of the substrate;

forming a contact hole in the passivation layer over the drain electrodes of the plurality of thin film transistors;

forming an amorphous indium tin oxide film on the passivation layer, wherein forming the amorphous indium tin oxide film includes using a target wherein zinc is added to the target;

selectively crystallizing portions of the amorphous indium tin oxide film formed in the pixel regions; and selectively removing uncrystallized portions of the amorphous indium tin oxide film with respect to the crystallized portions of the amorphous indium tin oxide film, wherein the selectively removing comprises selectively etching the uncrystallized portions of the amorphous indium tin oxide film with respect to the crystallized portions of the amorphous indium tin oxide film, wherein the selective etching is performed using an etchant selected from the group consisting of diluted oxalic acid, diluted hydrochloric acid, and combinations thereof, wherein the etchant has a concentration of about 10% or less and a temperature of about 60° C. or less, and flux of the etchant is about 30 liter/minute.

8. The method of claim 7, wherein the selectively crystallizing comprises selectively irradiating portions of the amorphous indium tin oxide film in the pixel regions using light.

9. The method of claim 8, wherein the selectively irradiating comprises positioning a mask directly over portions of the amorphous indium tin oxide film outside the pixel regions, wherein the mask transmits substantially none of the irradiated light.

10. The method of claim 7, wherein the etchant has a concentration between about 2% and about 5%.

11. A method for manufacturing a liquid crystal display (LCD) device comprising:

providing a substrate;

forming a plurality of gate lines and data lines on the substrate, wherein the plurality of gate and data lines cross each other and define a plurality of pixel regions;

forming a plurality of thin film transistors at crossings of the plurality of gate and data lines;

forming an amorphous indium tin oxide film over the substrate, wherein forming the amorphous indium tin oxide film includes using a target wherein zinc is added to the target;

selectively irradiating portions of the amorphous indium tin oxide film formed in the pixel regions with light, wherein portions of the amorphous indium tin oxide film irradiated with the light are crystallized; and selectively removing uncrystallized portions of the amorphous indium tin oxide film, wherein the selectively removing comprises selectively etching the uncrystallized portions of the amorphous indium tin oxide film with respect to the crystallized portions of the amorphous indium tin oxide film, wherein the selective etching is performed using an etchant selected from the group consisting of diluted oxalic acid, diluted hydrochloric acid, and combinations thereof, wherein the etchant has a concentration of about 10% or less, and a temperature of about 60° C. or less, and flux of the etchant is about 30 liter/minute.

12. The method of claim 11, wherein the selectively irradiating comprises positioning a mask over portions of the amorphous indium tin oxide film outside the pixel regions, wherein the mask transmits substantially none of the irradiated light.

13. The method of claim 11, wherein the etchant has a concentration between about 2% and about 5%.

* * * * *